May 3, 1949. L. B. RIVARD ET AL 2,469,243
ADJUSTABLE AUTOMOBILE SEAT
Filed Aug. 22, 1945 2 Sheets-Sheet 1

L. B. Rivard
R. J. McCarthy
INVENTORS

May 3, 1949.   L. B. RIVARD ET AL   2,469,243
ADJUSTABLE AUTOMOBILE SEAT
Filed Aug. 22, 1945   2 Sheets-Sheet 2

L. B. Rivard
R. J. McCarthy
INVENTORS

Patented May 3, 1949

2,469,243

UNITED STATES PATENT OFFICE 2,469,243

ADJUSTABLE AUTOMOBILE SEAT

Lawrence B. Rivard, Dearborn, and Russell J. McCarthy, Detroit, Mich., assignors to Ford Motor Company, Dearborn, Mich., a corporation of Delaware Application August 22, 1945, Serial No. 612,104

6 Claims. (Cl. 155—14)

This invention relates to adjustable seat mountings of the type used in automobiles and other vehicles; and, more particularly, to an adjustable seat which is carried on pivoted links through a plurality of various positions of adjustment and which may be locked and retained in any such selected position.

It is commonplace, of course, to provide longitudinally adjustable seats in motor vehicles, aircraft, and boats, particularly in the driver's compartment so that the proper relationship between the control pedals and steering wheel and the seat may be adjusted to suit the particular needs of the operator. Normally, these devices include a fixed track on which the seat is slidably mounted together with means to lock the seat in the selected position on the track. The difficulty with this type of structure is that the track frequently becomes fouled with an accumulation of dirt, lint and the like held on it by the lubricant necessarily provided and as a result the seat becomes progressively more difficult to operate and eventually will lock with respect to the track and further adjustment will be impossible. In order to avoid this difficulty, certain adjustable seats have been provided with a pivoted link mounting, so that the entire seat may swing forwardly or rearwardly on parallel pivotal axes rather than slide forwardly and rearwardly on a track. The disadvantages of this type of mounting have included the difficulty of securing the seat in its desired position of adjustment, the impracticability of obtaining with reasonable economy a pivotal mounting between the link and seat which will also prevent relative movement between these elements transversely of the vehicle, and the inherent characteristic of such linkages that as the seat is moved longitudinally of the vehicle, its elevation changes markedly.

An advantage of the present construction is that it embodies within a two-link pivoted type of seat support, adjusting means which are easily operable, economical to manufacture and which permit the locking of the seat in a number of selected positions of adjustment.

Another advantage is that following the construction shown, the seat as a unit may readily be detached from its mountings when this is desired, and yet it is securely held against movement transverse of the vehicle when installed on the links.

Still another advantage is that means are incorporated insuring uniform movement of the seat forwardly or rearwardly and preventing cocking with respect to the pivot points. Another advantage is that the mounting mechanism is largely self-contained and does not require careful positioning of the attaching means on the floor of the vehicle, which must be maintained in precise alignment to permit easy assembly.

Still another advantage of the construction is that the adjustment control means may be located adjacent the center of the seat rather than at the side thereof and hence is less likely to interfere with entrance to the seat.

One of the principal disadvantages of the former pivoted link types of mounting was that the seat—although occupying its successive parallel longitudinal positions—tended to rise and fall as the mounting was operated from one extreme position to the other. This is, of course, readily understandable, due to the circular path traced out by the pivoted links. However, in normal practice it is desirable to have the seat rise slightly as it is advanced and lower as it is withdrawn since, as a general rule, visual height of the driver is more or less proportional to the amount of leg room required. Thus, with shorter persons requiring a minimum amount of leg room, the seat should be higher to permit a clear and uninterrupted view through the windshield to the road; and, conversely, with taller persons requiring more leg room, the seat may well be lowered without any sacrifice in the field of vision. This is difficult to obtain in the old pivoted link mounting unless the rear half only of the permissible scope of movement were utilized. However, when this limitation was observed, the range of adjustment was seriously curtailed and the device so constructed was found to be unsatisfactory. The principal advantage of the present construction is that the forward portion of the seat, at least, rises slightly as the seat is advanced or is lowered slightly as the seat is withdrawn. The rear portion of the seat follows the true pivotal path and will rise and fall slightly through the complete range of the pivotal movement. It has been found that the relative position of the rear portion of the seat is not so important as that of the front portion, either from the standpoint of vision or comfort, so that the simple pivotal mounting shown at the rear is quite adequate for any ordinary installation. Nevertheless, if it be desirable in special instances, the mounting shown for the front portion of the seat in this specification may be applied to the rear as well with a suitable arrangement of co-operating seat surfaces, so that any desired path could be obtained as the seat moves from one extreme position to the other. However, in the present instance the construction shown is particularly suited to obtain, with minimum expense, the progressive leveling which has been found so desirable and which provides a seat automatically compensating for the individual requirements of persons of different heights.

Other advantages will be readily apparent from consideration of the device as described hereinafter in this specification, claimed in the claims, and illustrated in the accompanying drawings, in which:

Figure 1:
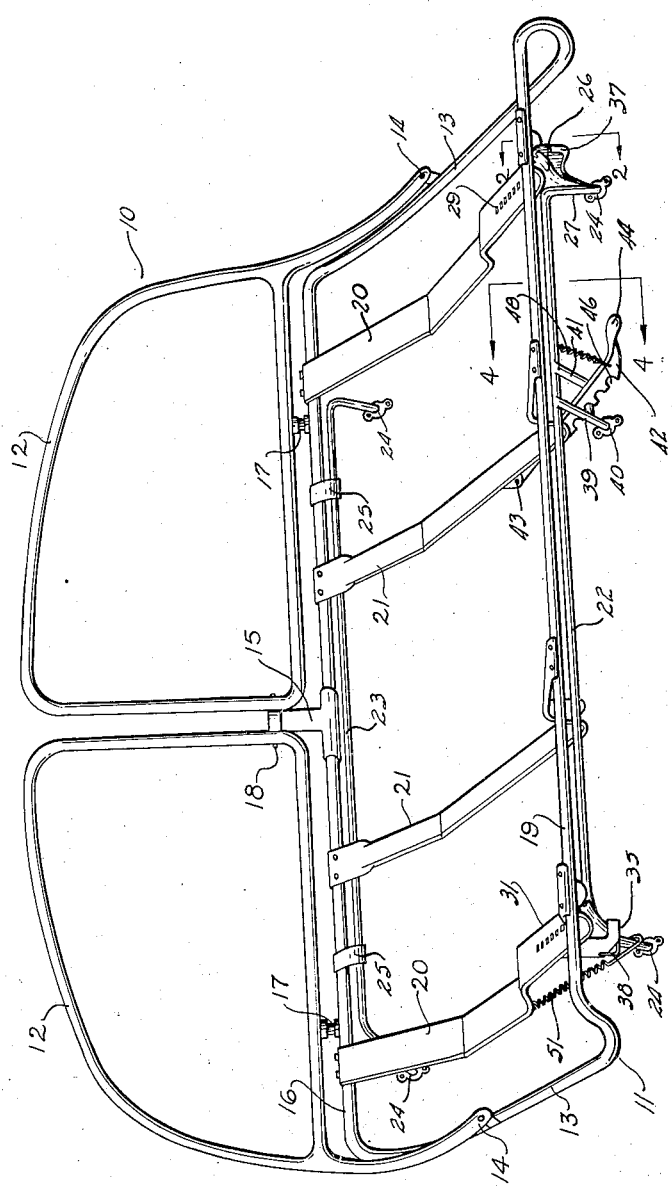
Figure 1 is a perspective view of the seat frame and mounting as applied to the front setat of a tudor type vehicle.

Referring first to Figure 1, 10 indicates generally an automotive front seat frame construction of the hinge type usually used in two-door sedans in which the seat frame proper is shown at 11 and to it are pivoted the two halves 12 forming the seat backs. These are attached to the side bar 13 of the frame 11 at 14 and to a center post 15 carried on the back bar 16. Resilient bumpers 17 are interposed between the back halves 12 and the back bar 16. It is apparent that as either half 12 is pulled forwardly, it rotates about an axis passing through its respective pivot 14 and the central pivot 18 and tends to move inwardly of the vehicle, thus permitting more room for access to the rear seats. In addition to the side bars 13, the back bar 16 and a front bar 19, the frame 11 includes the two end strainers 20 and the intermediate strainers 21, formed of metal stampings, which are riveted, welded, or otherwise permanently secured at their ends to the respective front and back bars and which are adapted to support the seat springs which, together with the usual padding and upholstery, go to make up the finished seat cushion.

The mounting for this structure includes front and back links 22 and 23 which are substantially in the form of an elongated U and which have their free ends pivotally secured in the mountings 24 which, in turn, are designed to be fastened to the floor of the vehicle. These links are thus free to rotate about parallel axes running transversely of the vehicle. The seat frame 11 is then carried on these links, having its back bar 16 secured to the back link 23 by the straps 25 which permit limited relative rotation of the two members and its front portion supported on the gear segments 26 which, in turn, are secured to the depending leg 27 of the front link 22.

Figures 2, 3:
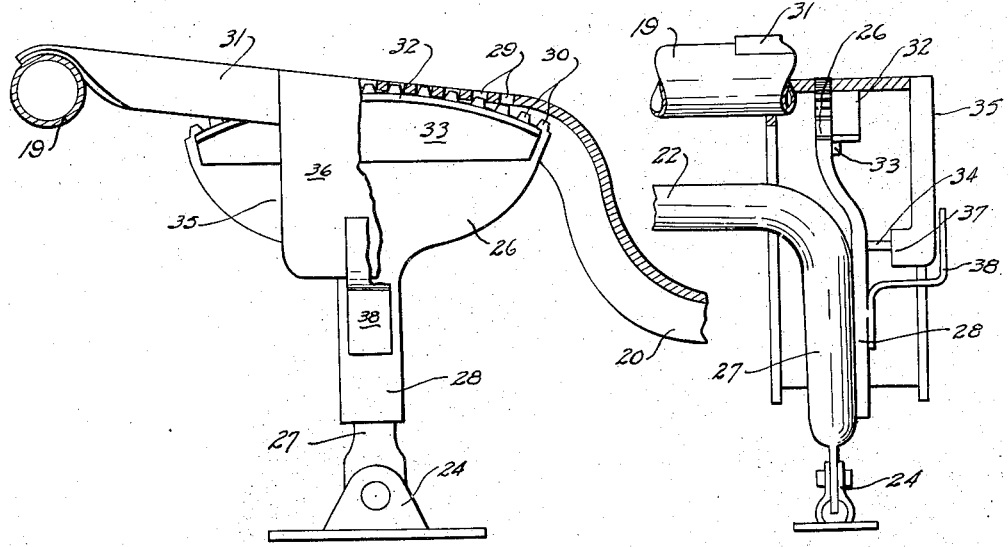
Figure 2 is a sectional elevation taken substantially as shown by the line 2—2 on Figure 1, portions of the mechanism being broken away to show in somewhat more detail the internal structure.
Figure 3 is a front view corresponding to Figure 2—portions of the structure again being broken away.

Attention is now directed to Figures 2 and 3 as showing in somewhat more detail the exact construction of the front support. It will be noted that the gear segment 26 has a shank 28 running along the depending leg 27 of the front link 22 and welded or otherwise permanently secured to it so that the gear segment follows the pivotal movement of the leg 27 with respect to the axes of the mounting 24. The end strainers 20 are provided with a number of aligned spaced apertures 29 which engage, successively, with the teeth 30 of the gear segment 26 so that there is a rolling rather than pivotal connection at the front of the seat frame 11. Furthermore, the forward portion 31 of each end strainer 20 rises slightly toward its point of connection with the front bar 19 so that as the seat is advanced, the forward portion of the seat tends to rise and as it is withdrawn, the front bar 19 is lowered correspondingly. Since the entire forward weight would be carried on the root area of the teeth 30, it may be desirable to provide an additional bearing surface indicated at 32 which is cylindrical in form substantially conforming to the root circle of the teeth 30 and having a flange 33 secured to the segment 26. This distributes the seat weight, and the teeth are operative mainly to impart the necessary movement between the link 22 and the strainer 20.

In order to prevent disengagement of the front bar 19 and the supporting structure, a pin 34 extends outwardly from the segment 26 and a box section 35 having an end wall 36 and an inwardly extending flange 37 across the bottom and extending partially up the front is attached to the outerside of the strainer 20. The flange 37 in co-operation with the pin 34 limits forward displacement of the strainer relative to the front link 22 so long as the back bar 16 is held on the back bar 23 by the straps at 25. However, when it is desired to remove the seat, removal of these straps permits the seat to be rotated sufficiently so that the pin can be disengaged over the top of the flange 33 and the entire structure lifted from the link 22. End play of the frame 11, with respect to the mounting means, is limited by the Z-shaped bracket 38 which has its lower end secured to the shank 28 of the sector 26, and its upper end partially overlies the outer surface of the box 35 and by the engagement of the outer end of the pin 34 with the inner surface of the end wall 36 of the box 35.

Figures 4, 5:
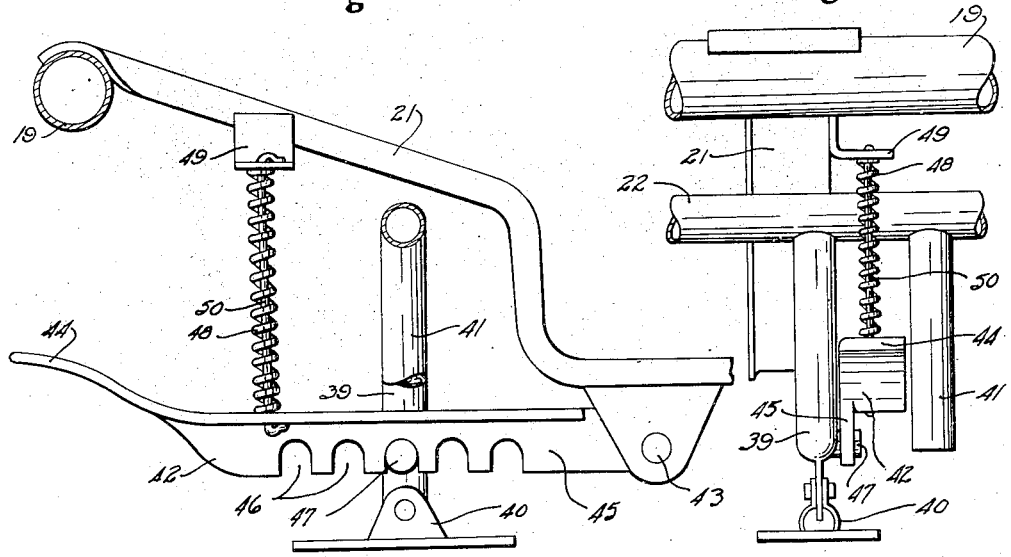
Figure 4 is a sectional elevation taken substantially as indicated by the line 4—4 of Figure 1.
Figure 5 is a front view corresponding to the showing of Figure 4.

The locking means is best shown in Figures 4 and 5 in conjunction with one of the intermediate strainers 21. In order to provide stability, an intermediate leg 39 is welded to the front link 22 and is pivotally supported at its bottom end in the central mounting 40. A parallel guard leg 41 is spaced slightly to one side of the intermediate leg 39 and is also carried on the front link 22; and, although it does not extend down to the floor, it and the leg 39 serve as a protecting fork for the locking lever 42 which is pivoted at 43 on the central part of the strainer 21 and extends forwardly to a handle 44 slightly forwardly of the front bar 19. The locking lever 42 is angular in section, with the exception of the end adjacent the pivot 43 and the handle 44 and its depending flange 45 has a series of spaced detent openings 46 adapted to engage a pin 47 carried on the intermediate leg 39. A coil spring 48 extending between a bracket 49 on the strainer 21 and the upper flange of the locking lever 42 resiliently urges the latter downwardly and with it is associated a central rod 50 which extends through both the bracket 49 and the upper flange of the locking lever 42 to secure the spring 48 in position and to limit the extreme position of the lever 42 with respect to the strainer 21. A second spring 51 extends between at least one of the legs 27 and its respective strainer to prevent rattling.

The operation of the mounting is believed to be quite clear from the foregoing. By using the pivotal link movement solely in the rear of the seat and providing a gear sector arrangement at the front in combination with a suitably inclined strainer section, the desired elevation of the seat can be obtained at minimum cost, while retaining all the advantages of the pivoted link construction together with an adequate range of adjustment. It will be noted that the entire structure may be installed as a unit and that its only contact with the vehicle body is through the attaching of the mountings 24 and 40 to the floor. Indeed, the adjustment lock itself functions directly with respect to the remainder of the mounting rather than utilizing an abutment on the body floor as has been common in other devices. The advantage of this is that the construction is complete in itself and does not require particular adjustment with respect to the body, except as to the installation of the five simple mountings. While the seat may be removed as a unit, it is restrained from undesirable movement when once in place and cannot be displaced due to shock or otherwise. It is extremely easy to operate, due to the pivotal mountings, as these are not affected by the accumulation of dirt nor will they jam or cock as is frequently the case with the track type of device.

Certain changes may be made in the specific construction disclosed herein, but it is our intention to cover by the claims such of these changes as are reasonably contained within the scope thereof.

The invention claimed is:

1. In an adjustable vehicle seat, a substantially rectangular seat frame having a front and a back bar joined by a plurality of transverse members, a substantially U-shaped rear link intermediately connected to said rear bar and having pivotal mountings at its ends, the pivotal axes of said mountings being in alignment; a V-shaped front link member having pivotal mountings at its ends, the pivotal axes of said last-named mountings being in alignment and in substantial parallelism with said first named axes, a connection between said front link and said front bar including a gear sector carried by said front link and adapted to rotate therewith above said last-named axes, and co-operating rack means on one of said transverse members rising forwardly to elevate progressively the front of said seat frame as said front link is rotated to advance said seat, and locking means carried by said seat frame to secure said seat frame in various successive positions of adjustment.

2. The structure of claim 1 which is further characterized in said locking means includes a fixed leg depending from said front link member, a pin extending from said leg, and a lever pivoted on one of said transverse members and having a plurality of detents adapted to engage said pin in successive positions of adjustment.

3. The structure of claim 1 which is further characterized in that means are provided on said gear sector to distribute the load of said transverse member thereon, said means comprising an extension of cylindrical configuration on said gear sector substantially aligned with the root of the teeth thereon and adapted to engage the lower surface of said transverse member.

4. The structure of claim 1 which is further characterized in that means are provided to prevent disengagement of said seat frame relative to said links, said means comprising a strap connection between the rear link and said frame and a demountable connection between said seat frame and said front link comprising a box-like member on one of said last-named members having a portion of one side cut away and a lower flange cooperating with a projecting pin element on the other of said last named members.

5. In an adjustable vehicle seat construction, comprising, a seat, a substantially U-shaped rear link member intermediately connected to said seat and having pivotal mountings at its end arranged in axial alignment, a U-shaped front link member having pivotal mountings at its end arranged in an axial alignment in substantial parallelism with said first-named axes, a connection between said front link and said seat including a gear sector carried by said front link and adapted to rotate therewith about said last-named axes, co-operating rack means on said seat meshing with said gear sector and rising forwardly to elevate progressively the front of said seat frame as said front link is rotated to advance said seat, and locking means carried by said seat and co-operating with one of said links to secure said seat in various successive positions of adjustment.

6. In an adjustable vehicle seat construction, a substantially rectangular seat frame having substantially parallel front and back bars joined by a plurality of transverse members, a pair of spaced U-shaped links adjacent, respectively, said front and back bars and extending therealong, pivotal mountings at the ends of said links, a gear sector secured to said front link and adapted to rotate therewith, a rack member meshing with said sector and mounted on one of said transverse members rising forwardly to elevate progressively the front of said seat frame as said front link is rotated to advance said seat, and means securing said seat frame to said links comprising strap connections between said back bar and said back link and an inwardly opening box section carried by said front bar outwardly of said front link, the forward wall of said box being cut away a substantial distance above the bottom thereof and a projecting element secured to said front link and extending outwardly therefrom and normally seated in said box but removable therefrom through said cutaway forward wall after rotation of said seat frame relative to said front link.

LAWRENCE B. RIVARD.
RUSSELL J. McCARTHY.

REFERENCES CITED

The following references are of record in the file of this patent:

UNITED STATES PATENTS

| Number | Name | Date |
| --- | --- | --- |
| 1,160,399 | Giberson et al. | Nov. 16, 1915 |
| 2,161,367 | McGregor et al. | June 6, 1939 |
| 2,195,507 | Best | Apr. 2, 1940 |
| 2,221,268 | Sears | Nov. 12, 1940 |
| 2,227,764 | Saunders et al. | Jan. 7, 1941 |
| 2,241,559 | Schulz | May 13, 1941 |
| 2,272,536 | Votypka | Feb. 10, 1942 |
| 2,276,373 | Cox | Mar. 17, 1942 |

FOREIGN PATENTS

| Number | Country | Date |
| --- | --- | --- |
| 105,821 | Australia | Nov. 14, 1938 |